United States Patent [19]

Bustin

[11] 3,760,940

[45] Sept. 25, 1973

[54] METHOD OF EMBOSSING THIN, LIMP PLASTIC FILM, AND DISPOSABLE AND EMBOSSED PLASTIC BAG PRODUCT

[75] Inventor: Franz Bustin, Rochester, N.Y.

[73] Assignee: Mobil Oil Corporation, New York, N.Y.

[22] Filed: July 2, 1971

[21] Appl. No.: 159,531

Related U.S. Application Data

[63] Continuation of Ser. No. 808,922, March 20, 1969, abandoned.

[52] U.S. Cl..................... 206/58, 229/53, 161/131, B65d/29/00
[51] Int. Cl............................................. B65d 85/67
[58] Field of Search......................... 206/58; 229/53

[56] References Cited
UNITED STATES PATENTS

| | | | |
|---|---|---|---|
| 3,411,698 | 11/1968 | Reynolds............................. | 229/53 |
| 3,173,601 | 3/1965 | Osborn, Jr............................ | 229/53 |
| 2,917,223 | 12/1959 | Le Bolt et al........................ | 229/53 |
| 2,069,333 | 2/1937 | Salfisberg...................... | 206/DIG. 5 |
| 1,507,949 | 9/1924 | Angier............................ | 206/58 UX |
| 3,283,992 | 11/1966 | Hanson et al......................... | 229/53 |
| 3,224,574 | 12/1965 | McConnell et al............. | 206/56 AB |
| 3,160,273 | 12/1964 | Reuther et al.................. | 206/56 AB |

*Primary Examiner*—Leonard Summer
*Attorney*—Oswald G. Hayes, Andrew L. Gaboriault and James D. Tierney

[57] ABSTRACT

Thin polyethylene film, of 0.025 mm, or less thickness is passed between a pair of matching embossing rollers having, respectively, negative and positive embossing patterns on their surface, driven at the same circumfernetial speed, the speed of the embossing rollers being suitably chosen to allow the film to pass between the rollers while being embossed. The rollers are preferably cooled; the continuous embossed web, if two-layer and tubular, is then inflated to separate the two-embossed layers, which can then be heat-sealed together at intervals and the edge slit to form separable bags, when rolled up in a single roll for ease of dispensing; the embossing patterns preferably, but not necessarily match at least at the heat-seal lines.

6 Claims, 9 Drawing Figures

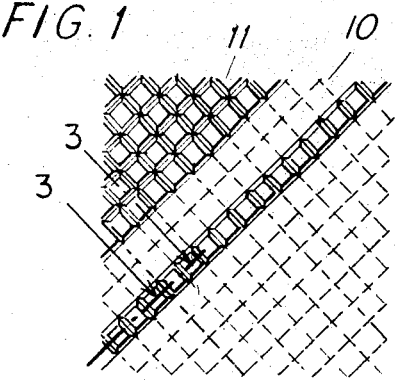
FIG. 1
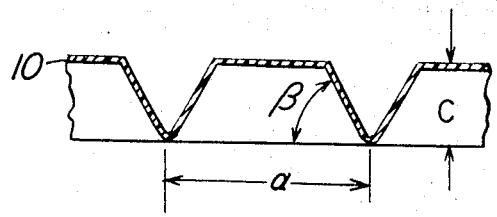
FIG. 2b
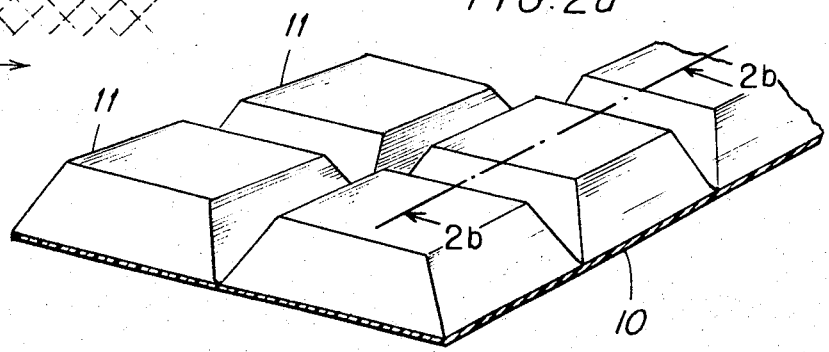
FIG. 2a
FIG. 3
FIG. 4
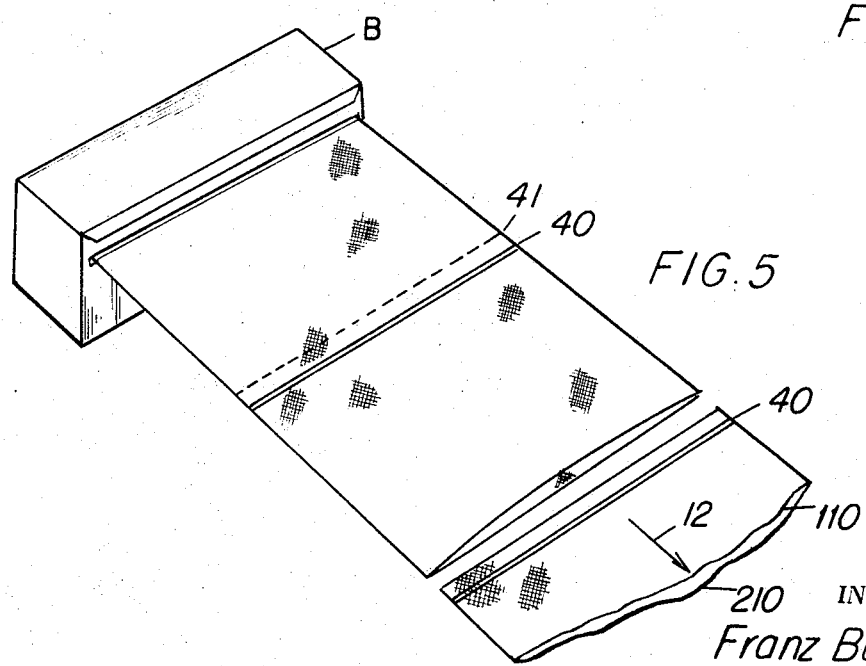
FIG. 5
INVENTOR.
Franz Bustin INVENTOR.
Franz Bustin

METHOD OF EMBOSSING THIN, LIMP PLASTIC FILM, AND DISPOSABLE AND EMBOSSED PLASTIC BAG PRODUCT

This is a continuation of application Ser. No. 808,922, filed Mar. 20, 1969, now abandoned.

The present invention relates to a method of embossing thin plastic film, preferably polyethylene film of 0.025 mm. or less thickness, and to disposable, embossed plastic bags made from webs of such embossed film.

Disposable bags, particularly for use as sandwich bags and other food wrappers for one-time use, have been made typically of polyethylene film of 0.025 mm thickness, or less, for example of thicknesses as thin as 0.015 and 0.020 mm. The particular thickness used varies with the use and the strength demanded which, for the usual type of sandwich wrapping, is very low. Such bags are easily made at high speed by extruding a tubular web and making transverse heat seals thereacross, with separating or tear-off lines for ease of separation of the resulting bags; the web may be slit or cut at one longitudinal edge, the bottom of the bag being formed by the remaining, unslitted fold of the previously tubular web, or single tear and separating lines may be formed adjacent transverse heat seals. Alternatively, a single flat web is folded over, and bags are then formed by making transverse heat seals, with tear-off lines therebetween. This alternative method requires, during manufacture, a folding station. Regardless of how made, the two layers of polyethylene material, which are very thin, tend to adhere together. This adhesion is due not only to air pressure against the two sides — the plastic bag material is air-impervious — but also due to static electricity which is picked up by the layers during the manufacture and during passage over transport, tension and idler rollers. The plastic material, itself, being a good insulator leaks charges only very slowly.

The polyethylene film, from which such bags have been made is in appearance transparent, and smooth. Differentiation between bags, for example, for containing one substance and another can be made only by tinting or coloring the base material, which introduces additional expense. The smooth film will stick not only to itself, making unrolling from a roll and thus dispensing more difficult but will also stick to the skin of the user, leaving the user with a disagreeable feel. While the smoothness provides for good sealing of two surfaces of the film against each other, it does have the disadvantage that it makes the bag harder to open and the material unpleasant to handle.

It is an object of the present invention to provide a polyethylene thin film bag which has a better feel (termed a "softer hand"), better appearance, enables variation of appearance, and in which the layers of the bag do not have the tendency to stick together or to the hands of the user; and to provide a method to inexpensively manufacture embossed polyethylene webs and continuous rolls of bags.

SUBJECT MATTER OF THE PRESENT INVENTION

Briefly, the bag structure is formed of an embossed limp plastic material having a thickness less than 0.025 mm and fused together along one side edge, or along both side edges, or in a flattened tubular form. The bag shape is determined by the position of the bag mouth and its position in relation to other bags on a continuous web, later reeled on a roll. Preferably, the embossing patterns are similar on both sides, that is layers of the bag and, further, they may be in registration, that is the embossed patterns may match, in the region of the fused lines. The two layers of the bag will not normally, even when wound tightly, lie in perfect registration since slight distortion will result, so that the bags will open easily, although both layers may have been embossed simultaneously during one passage of both layers, in overlying relation, through a pair of embossing rollers. The embossing pattern itself may, for example, be in the form of a truncated pyramid or the like, of approximately 0.5 mm depth (or, looked at from the other side of the bag — height), although different dimensions and different shapes may be used as desired, provided the material is not so deformed as to lose strength.

In accordance with a feature of the invention, the embossed web is made by passing a plain flat web of material, which may be single or double thickness, between a pair of embossing rollers having on their respective surfaces embossing projections and depressions interengaging and matching into each other, with the web material there-between; these rollers are driven to have a circumferential speed which is controlled relative to the speed of feeding of the web material there-between. The feeding speed of the web need not be the same as the speed of the web at other points in the apparatus. The smooth plastic web is preferably fed to the embossing rollers at a speed higher than the linear circumferential speed of the embossing rollers to permit the web to pucker. The embossed web is pulled from the rollers at higher than roller speed to stretch the correguation. The speeds of introduction of the web to, and withdrawal from the rollers, with respect to roller speed may, but need not, be substantially the same. The relative speeds depend on the depth of the embossed deformations, their shape, film thickness and strength, and similar factors, and can be determined experimentally. If the web material is tubular, it is then preferably separated by passing it through a pair of pinch rollers and introducing an air bubble. The surface temperature of the embossing rollers may be controlled to be above, or below ambient temperature; in actual operating experience it has been found that at high speeds it is preferred if the embossing rollers are artificially cooled.

Difficulties have been experienced in mass producing embossed film, as thin as 0.015 mm thick due to its limp nature and thinness, which is hole-free and of continuous uniformly high quality output. Only when the embossing was between a pair of matching, driven embossing rollers was it found possible to consistently provide reject-free material. The impressions can be arranged to insure point contact of the impression rolls so as to give a fine pattern; the resulting material will then have the appearance of somewhat increased thickness. The pattern may consist of adjacent squares or diamonds, or for example, may form an interlocking pattern such as a beehive pattern which may result in some increase of stiffness of the material, similar to an increase of stiffness in corrugated sheets. The appearance appeal, that is the aesthetic appeal can also be changed by changing the embossing pattern, resulting in changes in light reflection and refraction of light passing through the material. By embossing, scratch blemishes tend to disappear. The embossing depressions (and, conversely, projections) may be shallow. The depth of the depressions is limited by the material strength and the deformation reaches a limit when the film becomes weakened at the deformation lines. If desired, a point pattern can be placed at some predetermined locations to purposely weaken the material and provide additional tear lines, in any direction, relative to the travel of the web during manufacture, which is desired.

The invention will now be described by way of example with reference to the accompanying drawings, wherein:

FIG. 1 is a greatly enlarged plan view of a section of embossed material;

FIG. 2a is a perspective view, to a still more enlarged scale, of an embossed region of the web;

FIG. 2b is a transverse schematic view through the embossed web;

FIG. 3 is a transverse schematic view of a pair of embossed webs, in overlying matching relation;

FIG. 4 is a transverse schematic view of a pair of embossed webs, offset for ease of separation of the two webs, drawn to an exaggerated scale;

FIG. 5 is a partial view of bag structures, in continuous form adapted to be rolled off a roll dispenser in accordance with the present invention;

Figure 6:
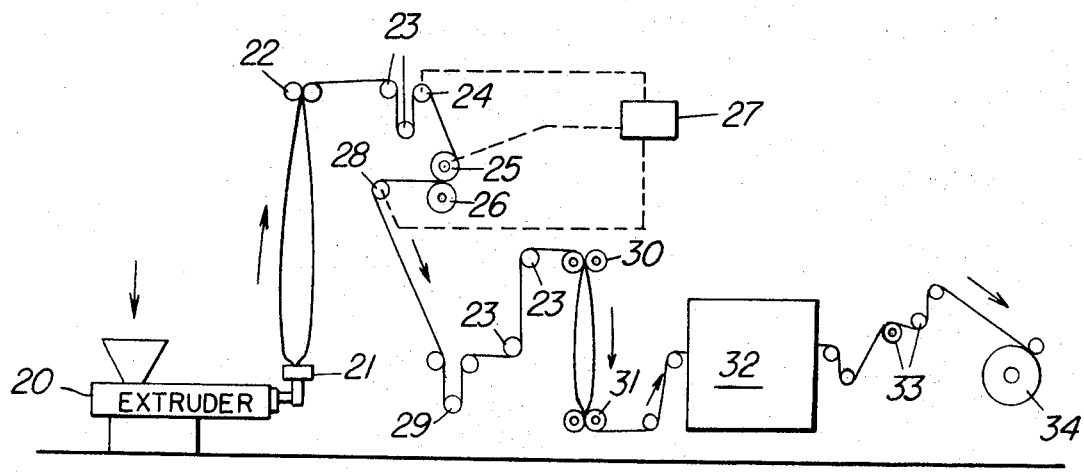
FIG. 6 is a schematic representation of manufacturing steps to manufacture continuous rolls of bags from a tubular web.

Referring now to the drawings: A web 10, of thin thermoplastic material, for example polyethylene of 0.015 mm thickness is deformed in the shape of truncated pyramids 11, best seen in FIG. 2a. The base distance between the pyramids, indicated at dimension $a$ at FIG. 2b may, for example, be about 1.5 mm; the angle of the sides, B may be 60° and the depth of the pyramid, dimension $c$ in FIG. 2b, about ½ mm. The truncated pyramids 11 may be arranged in line with the feed of the web as indicated by arrow 12 (FIG. 1) or may be arranged at an angle, for example, at 45° thereto, in diamond fashion. The dimensions above given pertain to polyethylene material of less than 0.025 mm thickness, typically of 0.015 mm thickness, and have been found suitable to provide the pleasant feel and ease of separation of superimposed layers, but should be considered as an example only.

The method of embossing webs, particularly for bags, is demonstrated in connection with FIG. 6 where parts of extrusion line are illustrated.

Plastic raw material is introduced, for example in pellet form into an extruder 20, from which a tubular web of the plastic material is obtained at a tubular die 21. An air bubble is introduced in the tubular web, which then passes between a pair of pinch rollers 22, so that the two sides of the web will be cooled as well as separated. The tubular web is then passed over a number of transport rollers 23, which may be driven. Roller 24 is spring loaded to equalize tension and actuates a speed controller 27 which regulates the speed of the embossing rolls 25 and 26. From transport roller 24 the material passes between the pair of driven embossing rolls 25, 26. From embossing rolls 25, 26 the web is passed over a pulloff roller 28, other transport rollers (not shown), a tension equalization unit 29, if desired, and over further transport rollers to two sets of pinch rollers 30, 31. An air bubble is introduced in the tubular web between the pinch rollers 30, 31 to separate the webs which may adhere together. The webs are then passed over a bag forming station 32 which may, for example, include apparatus to provide transverse heat seals at predetermined locations in the web, tear lines and the like as well-known in the art; and then, over idler roller 33 to wind-up reel 34.

The speed of the web as it is applied to, and withdrawn from the embossing rollers 25, 26 is regulated with respect to the linear circumferential speed of rotation of the embossing rollers themselves, so that the web is passed through the embossing rollers without being subject to stretching or strain on the web itself; as a consequence, the embossing rollers 25, 26 will normally have a lower linear circumferential speed than the web supply speed, so that the web can be embossed by pressure. The web can be pulled out from between the embossing rollers at substantially the same, or a somewhat lower (but not higher) speed than the speed of feed. Controller 27 thus controls the speed of roller 24, embossing rollers 25, 26, and pull-off roller 28. The relative speeds, and the degree of stretch imparted by the higher speed of rollers 24, 28, than embossing rollers 25, 26, will depend on the thickness and nature of the material, the depth and shape of embossing depressions, and similar factors and can be determined experimentally. For the dimensions given, the pull-off speed at roller 28 can be substantially the same and only a little less, for example three-five percent than supply speed at roller 24 while the embossing rollers 25, 26 speed can be less by 20 percent or even more of supply speed at roller 24.

Embossing rollers 25, 26 are made of non-yielding material, for example of steel. Embossing roller 25 has the pattern arranged thereon so that the truncated pyramids 11 will project; a matching pattern, with the truncated pyramids formed as recesses is then located on roller 26. The rollers are temperature controlled, preferably cooled below ambient room temperature. The finish of the steel rollers 25, 26 is preferably smooth. Other materials can be used; if runs of comparatively small quantitites, only, of specific patterns are needed, one of the rollers, for example, roller 25 may be engraved with a raised embossing pattern. The other roller can then be made with an initially smooth lead surface, the steel roller being used to itself deform the softer lead to make a matching negative embossing pattern thereon. The two rollers, one with the positive and the other with the negative embossing pattern, are then used in place of the two steel rollers 25, 26.

The tubular web, which is in two layers, as it comes from the embossing rolls will, in cross-section have the appearance as seen in FIG. 3, where a top web 110 and a bottom web 210 are located in overlying relation — FIG. 3 being greatly enlarged and showing the relationship of two webs exaggerated and slightly separated for ease of illustration. After the webs have been inflated, that is have passed through pinch rollers 31, the embossing may no longer match and webs 110, 210 may be located as illustrated in FIG. 4. This offset of the embossed areas with respect to each other provides a small distance between the webs 110, 210 which may be due to uneven stretching, slight skew and other manufacturing and process imperfections. When thin thermoplastic materials, i.e., on the order of about 0.015 mm or less thickness are employed to form the embossed bag structures of the present invention, it has been found desirable to insure substantially complete inter-wall registration of the embossed pattern, (see FIG. 3). Offset or non-registration (as illustrated in FIG. 4) of the pattern when such relatively thin film materials are employed may result in an undesirable distortion of the embossed pattern when compressive forces are applied to the bag walls, e.g., when a series of connected bags are wound into roll form. At the bag forming station 32, transverse heat seals 40, and tear lines 41 are applied to the webs 110, 210 (see FIG. 5). The webs, after having been spooled on take-up reel 34, can be re-spooled for dispensing from a box B in continuous form. The webs 110, 210, due to their embossed deformations from flat strips and the usual random overlying relationship, particularly due to the suppleness of the material will separate easily, and further provide a softer hand and more pleasant feel to the user.

Figure 7:
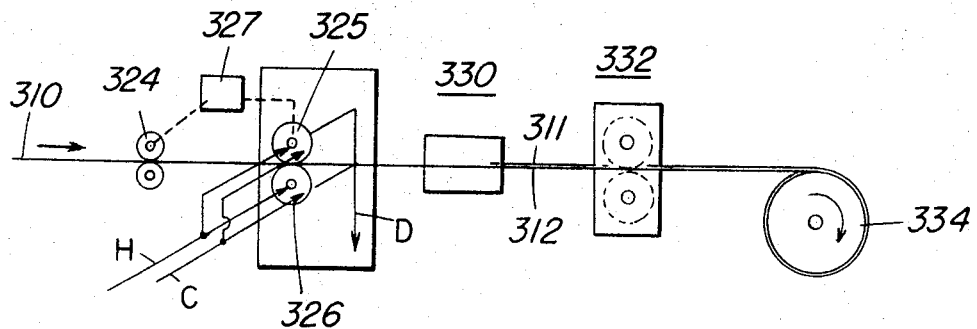
FIG. 7 is a partial view of the manufacturing steps to make embossed bags from a flat web.
Figure 8:
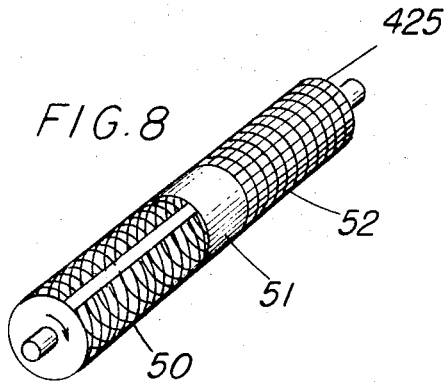
FIG. 8 is a perspective view of an embossing roller having different patterns, and a blank section thereon.

It is also possible to emboss single layer webs. Referring to FIG. 7, a single layer web 310 is passed through a pair of driven rollers 324, connected to a speed control 327, which also controls the rotational speed of the pair of embossing rollers 325, 326. The embossing rollers are temperature controlled, for example, by selectively passing hot or cold water therethrough through lines H, and C, respectively, the water being taken out by a drain line D. The pattern on the embossing rollers 325, 326 need not be continuous or be the same throughout the entire length of the roller. FIG. 8 illustrates a roller 425 which has a first diamond shaped embossing section 50, followed by a blank section 51, followed by a square embossing section 52. The shapes of the embossing projections (and in the matching roller, not shown, embossing cavities) may, again, be as desired by the eventual appearance of the materials. The embossings may be interlocked, square, hexagonal or have any other suitable shape desired by a designer.

Referring again to FIG. 7, the embossed flat web can be folded into suitable shape in folding station 330 which, by in itself, is well-known in the art into a double layer web as indicated schematically by the double lines at the terminal end of station 330. The double webs now having a top layer 311 and a bottom layer 312 can, again, be passed through a bag forming machine 332 and then be spooled up on a take-up reel 334.

When bags are made with embossing rollers 425, as illustrated in FIG. 8, the embossing pattern on the top layer 311 may be different from the pattern of the bottom layer 312, so that non-coincidence of the embossing pattern will necessarily result, thus further improving ease of separation. If bags are to be made from such a folded-over web, one side of the web will have a closed fold along one longitudinal edge and a pair of heat-fuse lines, one each adjacent a weakened tear line. The continuous web may then be separated into individual bag units. The web may also be folded from both sides towards the middle so that double pocket bags can be formed. The web may be folded, for example, in regions where the embossing rollers do not have an embossing pattern applied thereto, that is in region 51 (FIG. 8), or at a change from one pattern to another, with no unembossed intermediate position separating adjacent embossed patterns.

The present invention has been illustrated and described in connection with embossed bag structures. It is not intended to be limited to the details as shown, and various structural changes and modifications may be made. For example, if flat, embossed webs are required, the folding and bag forming stations 330, 332 (FIG. 7) may be omitted; the webs may be embossed by rollers as illustrated in FIG. 8, or by rollers which have only one pattern thereon.

I claim:

1. Thermoplastic bag structure comprising a pair of juxtaposed wall layers of substantially identically embossed, limp thermoplastic material having a thickness of less than 0.025 mm, said layers being fused together along a line adjacent to a transverse edge thereof; said bag structure being characterized in that, when said bag structure is in a lay flat condition, the individual embossments on said respective layers in the region immediately adjacent said fuse line are substantially in registration while the remainder of the individual embossments on said respective layers being substantially out of registry.

2. Thermoplastic bag structure as claimed in claim 1 wherein said fuse line is spaced from said transverse edge.

3. Bag structure according to claim 1 wherein the embossing comprises deformations in the form of truncated pyramids.

4. Bag structure according to claim 1 wherein the embossing comprises deformations having a dimension of approximately 0.5 mm in depth.

5. Bag structure according to claim 1 joined to a plurality of identical bag structures and rolled as a continuous strip of bags into a roll; and transverse tear lines located on said fuse lines and separating individual bag structures on said web from each other.

6. A continuous series of bag structures rolled as a continuous strip of bags into a roll; said individual bags being defined by transverse tear lines located adjacent to transverse fuse lines which tear lines separate individual bag structures on said web from each other, said individual bag structures being further characterized as comprising a pair of juxtaposed layers of embossed limp thermoplastic material having a thickness less than about 0.025 mm., the embossing pattern on both of said layers being substantially identical; said bag structure being further characterized in that when the bag is in a lay flat position the individual embossments on said respective layers in the region immediately adjacent to said fuse lines are substantially in registration while the remainder of the individual embossments on said respective layers are substantially out of registry.

* * * * *